US010713705B2

(12) United States Patent
Dasar et al.

(10) Patent No.: US 10,713,705 B2
(45) Date of Patent: Jul. 14, 2020

(54) SYSTEM AND METHODS FOR COLLABORATIVE PURCHASING IN AN INFORMATION HANDLING SYSTEM

(71) Applicant: DELL PRODUCTS, LP, Round Rock, TX (US)

(72) Inventors: Sundar Dasar, Round Rock, TX (US); Muninder "Raja" Arram, Round Rock, TX (US); Harikrishnan G. Nair, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 320 days.

(21) Appl. No.: 15/407,786

(22) Filed: Jan. 17, 2017

(65) Prior Publication Data

US 2018/0204269 A1  Jul. 19, 2018

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0601* (2013.01); *G06Q 30/0621* (2013.01); *G06Q 30/0635* (2013.01); *G06Q 30/0641* (2013.01)

(58) Field of Classification Search
CPC . G06Q 30/0601–0645; G06Q 30/0633; G06Q 30/0621; G06Q 30/0635; G06Q 30/0641
USPC ......... 705/26.1–27.2, 26.8, 26.5, 26.81, 27.1
See application file for complete search history.

(56) References Cited

U.S. PATENT DOCUMENTS

| | | | |
|---|---|---|---|
| 2004/0210482 A1* | 10/2004 | Keneaki ................. | G06Q 30/02 705/14.26 |
| 2008/0133423 A1 | 6/2008 | Adiga et al. | |
| 2008/0177641 A1 | 7/2008 | Herniak et al. | |
| 2009/0171804 A1* | 7/2009 | Lee ..................... | G06Q 30/0601 705/26.1 |
| 2010/0106602 A1* | 4/2010 | Fuzell-Casey ......... | G06Q 30/02 705/14.58 |
| 2010/0299228 A1* | 11/2010 | Smith .................... | G06Q 30/02 705/26.8 |
| 2013/0211953 A1 | 8/2013 | Abraham et al. | |
| 2014/0006123 A1* | 1/2014 | Kepecs .............. | G06Q 30/0601 705/14.16 |

(Continued)

OTHER PUBLICATIONS

Last-Minute Holiday Shoppers Rejoice! shop.com Offers Instant-Delivery eGifts. Dec. 11, 2007 (Dec. 11, 2007). Business Wire. (Year: 2007).*

*Primary Examiner* — Jeffrey A. Smith
*Assistant Examiner* — Allison G Wood
(74) *Attorney, Agent, or Firm* — Larson Newman, LLP

(57) ABSTRACT

An information handling system includes gift selection circuitry, buying circuitry, and a graphical user interface. The gift selection circuitry includes a selection processing device, and a delivery processing device. The selection processing device receives, from a user, a request to add a list of items to a cart. The delivery processing device provides a secure link to a designated individual after the list of items is added to the cart. The graphical user interface displays the items in the cart as a list of available items in response to the secure link being selected by the designated individual. The buying circuitry confirms an order of a first item after selection of the first item from the list of available items, and sends a notification of completion of the transaction to the user.

17 Claims, 3 Drawing Sheets

(56) References Cited

U.S. PATENT DOCUMENTS

| | | | |
|---|---|---|---|
| 2014/0108178 A1 | 4/2014 | Cao | |
| 2014/0279213 A1* | 9/2014 | Swenson | G06Q 30/0633 705/26.8 |
| 2014/0372251 A1* | 12/2014 | Rodell | G06Q 30/0641 705/26.7 |
| 2015/0170276 A1 | 6/2015 | Lingam et al. | |
| 2016/0005028 A1* | 1/2016 | Mayblum | G06Q 20/342 705/26.81 |

* cited by examiner

SYSTEM AND METHODS FOR COLLABORATIVE PURCHASING IN AN INFORMATION HANDLING SYSTEM

FIELD OF THE DISCLOSURE

The present disclosure generally relates to information handling systems, and more particularly relates to collaborative purchasing in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

SUMMARY

An information handling system includes gift selection circuitry and buying circuitry. The gift selection circuitry includes a selection processing device, a delivery processing device, and the gift selection circuitry can display a graphical user interface. The selection processing device may receive, from a user, a request to add a list of items to a cart. The delivery processing device may provide a secure link to a designated individual after the list of items is added to the cart. The graphical user interface may display the items in the cart as a list of available items in response to the secure link being selected by the designated individual. The buying circuitry may confirm an order of a first item after selection of the first item from the list of available items, and may send a notification of completion of the transaction to the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
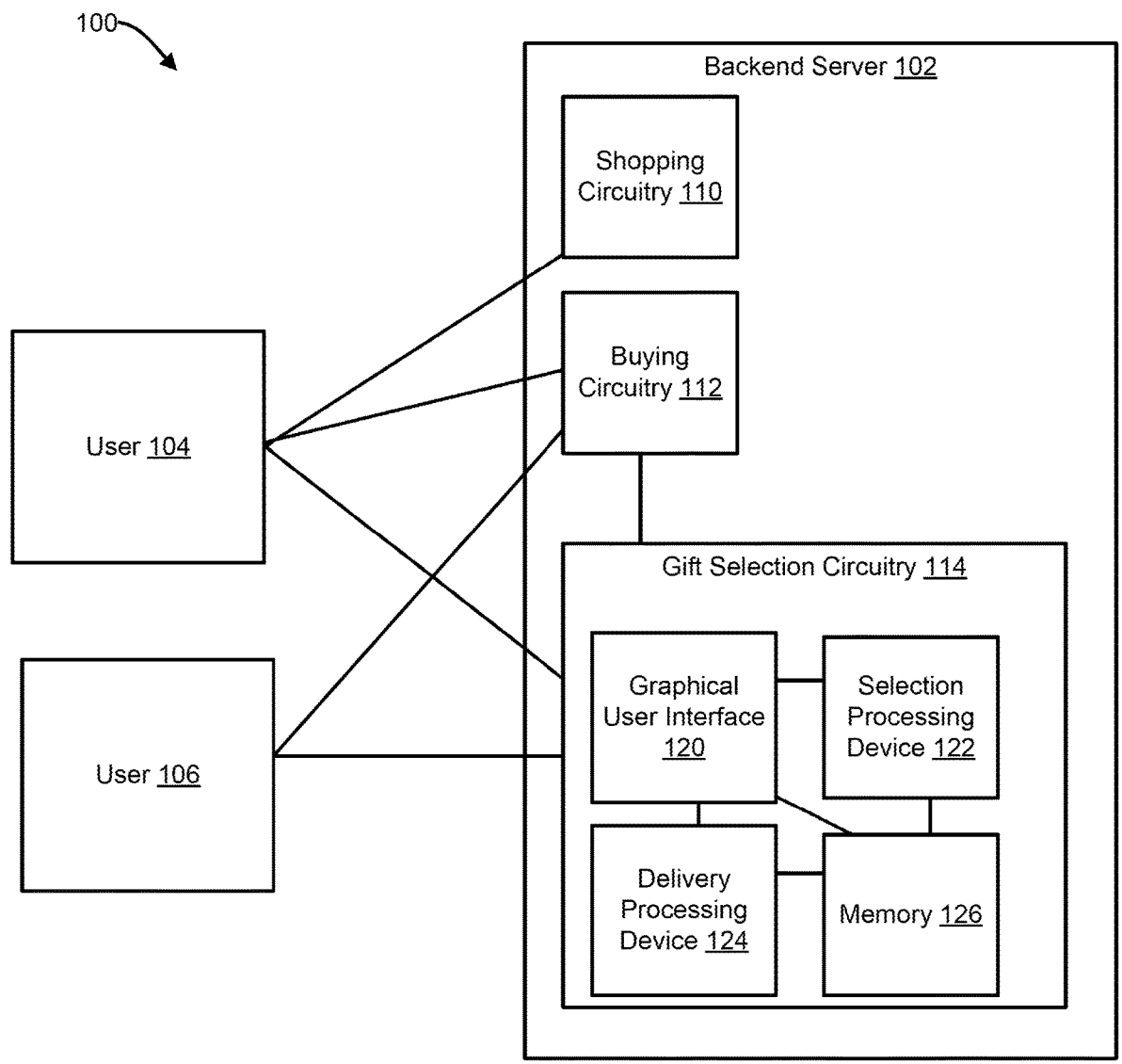
FIG. 1 is a block diagram of an information handling system according to an embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system is illustrated in FIG. 1, the term "system" shall also be taken to include any collection of systems or sub-systems that individually or jointly execute a set, or multiple sets, of instructions to perform one or more computer functions.

The information handling system 100 includes a backend server 102, and users 104 and 106. The backend server 102 includes shopping circuitry 110, buying circuitry 112, and gift selection circuitry 114. The gift selection circuitry 114 includes a graphic user interface 120, a selection processing device 122, a delivery processing device 124, and a memory 126. The users 104 and 106 can communicate with the components of the backend server 102 including the shopping circuitry 110, the buying circuitry 112, and the gift selection circuitry 114. Thus, the users 104 and 106 can also communicate with the components of the gift selection circuitry 114 including the graphical user interface 120, the selection processing device 122, and the delivery processing device 124. In an embodiment, the graphical user interface 120 can be generated and displayed on a display of the information handling system 100, such as display 330 of FIG. 3, by a graphics processor. The graphics processor that generates the graphical user interface 120 can communicate with the selection processing device 122, with the delivery processing device 124, and with the memory 126. The selection processing device 122 and the delivery processing device 124 can both communicate with the memory 126.

During operation, user 104 can connect with the backend server 102 with the intent to select and purchase an item for a designated individual, such as user 106. In an embodiment, the user 104 can be referred to as a customer, buyer, or the like. In a previous configuration of the backend server 102, the user 104 could communicate with the shopping circuitry 110 to pick a few items that he or she would like to purchase for a designated individual 106. The user 104 could then add the items to a cart, or could copy links to the items. The user 104 would then send the designated individual 106 either a link to the cart or individual links to each item selected. The designated individual 106 would then have the opportunity to click on the links, which in turn would enable the designated individual to communicate with the shopping circuitry 110 and view the selected items.

After the designated individual 106 has determine which item or items he or she would like, the designated individual could notify the user 104 of these items. The user 104 could then communicate with the buying circuitry 112 to purchase one or more items for the designated individual after looking at the items the designated individual selected. Thus, this process involves back and forth communication between the users 104 and 106 before the actual item is purchased, which can make this process tedious and time consuming.

In a current embodiment, the user 104 can communicate with the shopping circuitry 110 to search for possible items to purchase for the designated individual 106. Different items can be displayed on the graphical user interface 120, and the user 104 can communicate with the selection processing device 122 to select one or more items for the designated individual. In an embodiment, the user 104 can be a person within a company and the designated individual 106 can be multiple people at the same company. For example, the user 104 can be a person in charge of a department, and the designated individual 106 can be each person that works in that department.

Every time the user 104 selects an item displayed on the graphical user interface 120, the selection processing device 122 can store the item in a list of items within the memory 126. When the user 104 is done selecting different items, the user 104 can request that the items in the list of items be placed in a cart. The selection processing device 122 can then prompt the user 104 to determine whether the user would like to add different options for the items in the list.

If the user 104 decides to add options to the items in the list, the user 104 can interact with the graphical user interface 120 to select different options and the selected options can be stored in the memory 126 by the selection processing device 122. In an embodiment, an option can be that the user 104 can check out or pre-purchase the items for a specific period of time, such that the designated individual 106 can have get the items in the list at anytime within the specific period of time and the items will have already been paid for by the user 104. In an embodiment, another option can be that the user can state whether the designated individual 106 can buy only one item from the cart, multiple items, or the like.

In an embodiment, another option can be that the user pre-authorizes an amount of funds for the purchase of any number of the items in the list. For example, the user can enter his or her credit card number that the backend server 102 can pre-authorize for a cost of one or more of the items in the cart, and that pre-authorized amount can specify a maximum amount of money for the items. This pre-authorized amount of money can enable the designated individual 106 to purchase any number of items on the list as long as the total cost of the items is equal to or less than the pre-authorized amount. In an embodiment, another option can be that the user 104 can add optional cushion money over the initial cost of the items within the pre-authorized amount that can be used by the designated individual 106 to modify the items. In an embodiment, these options can be presented to the user 104 in any manner on the graphical user interface, such as listed in a drop down menu, placed in different boxes on the graphical user interface 120, or the like.

The user 104 can then provide the delivery processing device 124 with information associated with the designated individual 106. In an embodiment, the information for the associated the designated individual 106 can include an electronic mail identification for the designated individual. The delivery processing device 124 can then send a secure link to the designate individual 106 based on the information received about the designated individual. In an embodiment, the secure link can enable the designated individual 106 access to view and buy the items in the cart without exposing any confidential information of the user 104, such as credit card information used to purchase the item or items for the designated individual. After the designated individual 106 clicks or otherwise selects the secure link, the designated individual 106 can communicate with the graphical user interface 120, such that the items listed in the cart are displayed to the designated individual 106.

The designated individual 106 can then selected one or more items displayed as a list of available items on the graphical user interface 120. In an embodiment, the selection of the item can cause the item to be purchased by the user 104 on behalf of the designated individual via a one click purchase. For example, if the designated individual clicks on an item in the list of available items the buying circuitry 112 can complete the transaction for that item based on the pre-authorized options from the user 104. In an embodiment, the selection of the item can also include modifications to a configuration of the item based on options enabled by the user 104, can include selection of multiple items if authorized by the user 104, or the like. The buying circuitry 112 can then confirm the purchase of an item, and can complete the transaction. In an embodiment, after the transaction is completed any item in the list of available items not selected items can be removed from the cart in memory 126. In an embodiment, also after completion of the transaction any unused funds can be refunded to the user 104. The buying circuitry 112 can then send a notification of completion of the transaction to the user 104. In an embodiment, the notification can be sent via an electronic mail message, and the notification can include transaction details from the purchase of the item or items. Thus, the advantages of this embodiment, with the gift selection circuitry 114 can include: pre-authorization of items in a cart for the designated individual 106, that one click buying can be performed by the designated individual 106 even though the user 104 is actually buying the item for the designated individual 106, the communication between the user 104 and designated individual is removed from the process, and the designated individual 106 can utilize a secure link to finalize the purchase of the item.

Figure 2:
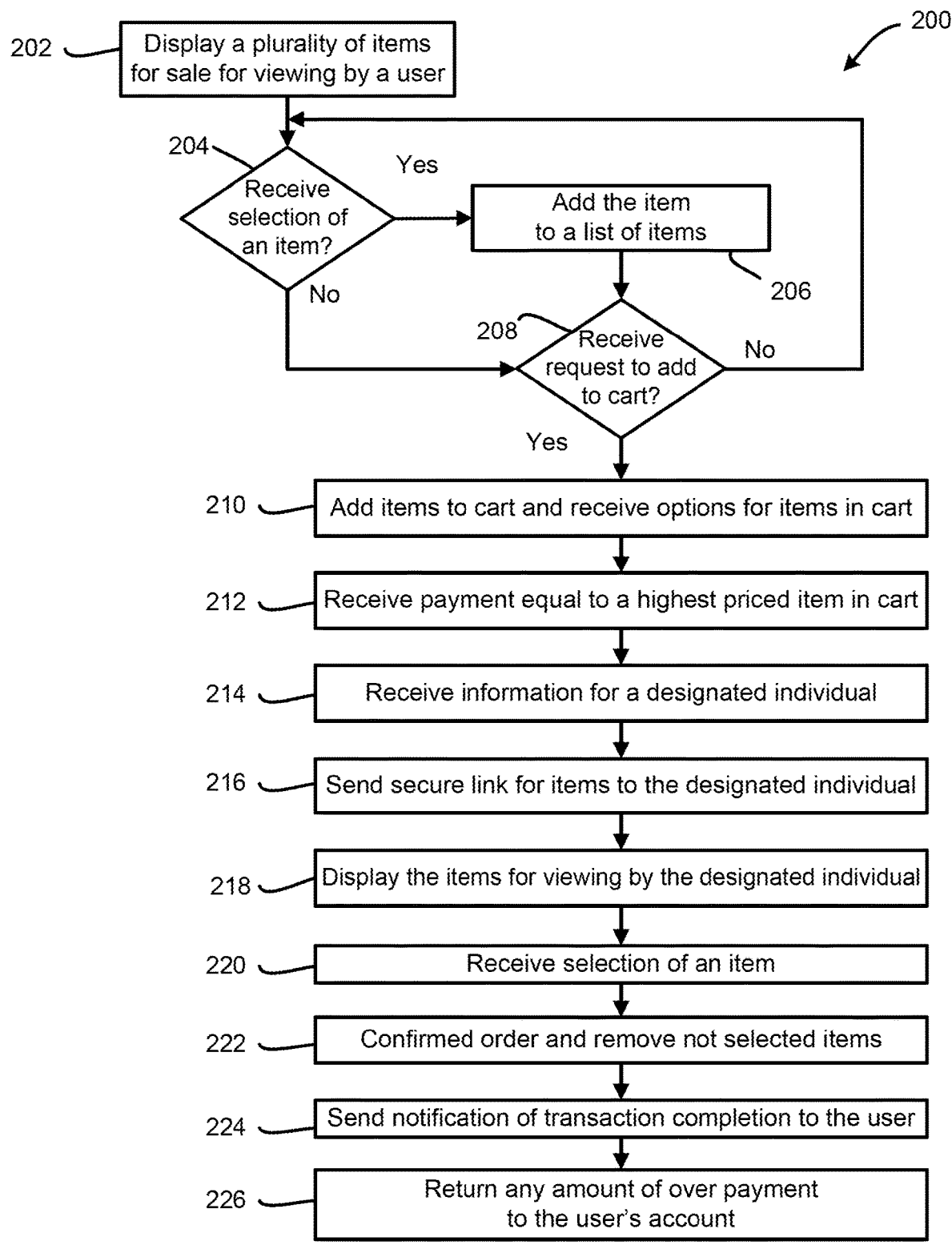
FIG. 2 is a flow diagram of a method for providing a collaborative purchase within an information handling system according to an embodiment of the present disclosure.

FIG. 2 is a flow diagram of a method 200 for providing collaborative purchasing in an information handling system according to an embodiment of the present disclosure. In an embodiment, the method 200 is performed by the components of the gift selection circuitry 114, and the buying circuitry 112 of FIG. 1. At block 202, items for sale are displayed for view by a user. In an embodiment, the items can be displayed on a graphical user interface, such as graphical user interface 120 of FIG. 1, in response to a search query, a selection of a category, previous history, or the like. At block 204, a determination is made whether an item is selected. If an item is selected, the flow continues at block 206 and the selected item is added a list of items. The flow then continues at block 208. If an item is not selected at block 204, the flow continues at block 208 and a determination is made whether a request to add the list of items to a cart.

If a request to add the list of items to a cart is not received, the flow continues as stated above at block 204. Otherwise, if the request to add the list of items to a cart is received, the items are added to a cart and options for the items are received at block 210. In an embodiment, an option can be that the user can check out or pre-purchase the items for a specific period of time. In an embodiment, another option can be that the user can state whether a designated individual can buy only one item from the cart, multiple items, or the like. In an embodiment, another option can be that the user pre-authorizes an amount of funds for the purchase of any number of the items in the list. For example, the user can enter his or her credit card number that a backend server can pre-authorize for a cost of one or more of the items in the cart. In an embodiment, the pre-authorized amount can specify a maximum amount of money for the items, such that the designated individual can purchase any number of items on the list as long as the total cost of the items is equal to or less than the pre-authorized amount. In an embodiment, another option can be that the user can add optional cushion money over the initial cost of the items within the pre-authorized amount that can be used by the designated individual to modify the items.

At block 212, payment for a highest priced item in the cart is received. In an embodiment, the payment for the highest priced item is received, so that the designated individual can select any item in the cart and the pre-paid payment will still cover the cost of the item. At block 214, information for the designated individual that the user wants to allow to buy one or more items from the cart. In an embodiment, the information can include an electronic mail identification. A secure link is sent to the designate individual based on the information received about the designated individual at block 216. In an embodiment, the secure link can enable the designated individual access to view and buy the items in the cart without exposing any confidential information of the user, such as credit card information. At block 218, the items are displayed to the designated individual in response to the designated individual selecting the secure link.

At block 220, a selection of an item can be received. In an embodiment, the selection of the item can cause the item to be purchased via a one click purchase. In an embodiment, the selection of the item can include modification of a configuration of the item based on options enabled by the user, can include selection of multiple items if authorized by the user, or the like. The order is confirmed after selection of the item or items is completed and the not selected items are removed from the cart at block 222. At block 224, a notification of completion of the transaction is sent to the user. In an embodiment, the notification can be sent via an electronic mail message, and the notification can include transaction details from the purchase of the item or items. Any amount of over payment received is returned to the user's account at block 226.

Figure 3:
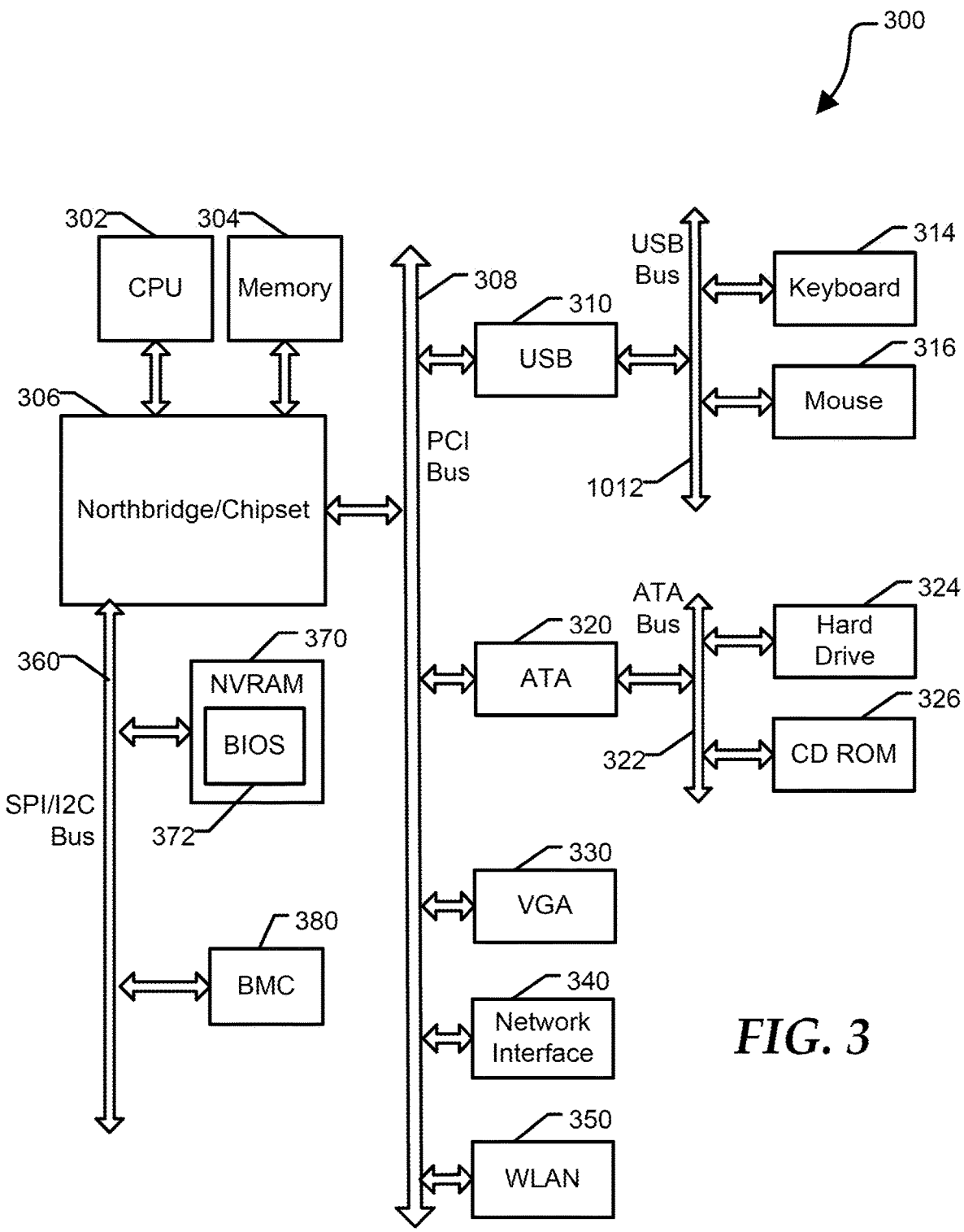
FIG. 3 is a block diagram of a general information handling system according to an embodiment of the present disclosure.

FIG. 3 shows an information handling system 300 including a processor 302, a memory 304, a northbridge/chipset 306, a PCI bus 308, a universal serial bus (USB) controller 310, a USB 312, a keyboard device controller 314, a mouse device controller 316, a configuration an ATA bus controller 320, an ATA bus 322, a hard drive device controller 324, a compact disk read only memory (CD ROM) device controller 326, a video graphics array (VGA) device controller 330, a network interface controller (NIC) 340, a wireless local area network (WLAN) controller 350, a serial peripheral interface (SPI) bus 360, a NVRAM 370 for storing BIOS 372, and a baseboard management controller (BMC) 380. BMC 380 can be referred to as a service processor or embedded controller (EC). Capabilities and functions provided by BMC 380 can vary considerably based on the type of information handling system. For example, the term baseboard management system is often used to describe an embedded processor included at a server, while an embedded controller is more likely to be found in a consumer-level device. As disclosed herein, BMC 380 represents a processing device different from CPU 302, which provides various management functions for information handling system 300. For example, an embedded controller may be responsible for power management, cooling management, and the like. An embedded controller included at a data storage system can be referred to as a storage enclosure processor.

For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as CPU 302, a programmable logic array (PLA), an embedded device such as a System-on-a-Chip (SoC), or other control logic hardware. Information handling system 300 can also include one or more computer-readable medium for storing machine-executable code, such as software or data.

System 300 can include additional processors that are configured to provide localized or specific control functions, such as a battery management controller. Bus 360 can include one or more busses, including a SPI bus, an I2C bus, a system management bus (SMBUS), a power management bus (PMBUS), and the like. BMC 380 can be configured to provide out-of-band access to devices at information handling system 300. As used herein, out-of-band access herein refers to operations performed prior to execution of BIOS 372 by processor 302 to initialize operation of system 300.

BIOS 372 can be referred to as a firmware image, and the term BIOS is herein used interchangeably with the term firmware image, or simply firmware. BIOS 372 includes instructions executable by CPU 302 to initialize and test the hardware components of system 300, and to load a boot loader or an operating system (OS) from a mass storage device. BIOS 372 additionally provides an abstraction layer for the hardware, such as a consistent way for application programs and operating systems to interact with the keyboard, display, and other input/output devices. When power is first applied to information handling system 300, the system begins a sequence of initialization procedures. During the initialization sequence, also referred to as a boot sequence, components of system 300 are configured and enabled for operation, and device drivers can be installed. Device drivers provide an interface through which other components of the system 300 can communicate with a corresponding device.

Information handling system 300 can include additional components and additional busses, not shown for clarity. For example, system 300 can include multiple processor cores, audio devices, and the like. While a particular arrangement of bus technologies and interconnections is illustrated for the purpose of example, one of skill will appreciate that the techniques disclosed herein are applicable to other system architectures. System 300 can include multiple CPUs and redundant bus controllers. One or more components can be integrated together. For example, portions of northbridge/chipset 306 can be integrated within CPU 302. Additional components of information handling system 300 can include one or more storage devices that can store machine-executable code, one or more communications ports for communicating with external devices, and various input and output (I/O) devices, such as a keyboard, a mouse, and a video display. An example of information handling system 300 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 300 can include a set of instructions that can be executed to cause the information handling system to perform any one or more of the methods or computer based functions disclosed herein. The information handling system 300 may operate as a standalone device or may be connected to other computer systems or peripheral devices, such as by a network.

In a networked deployment, the information handling system 300 may operate in the capacity of a server or as a client user computer in a server-client user network environment, or as a peer computer system in a peer-to-peer (or distributed) network environment. The information handling system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single information handling system 300 is illustrated, the term "system" shall also be taken to include any collection of systems or sub-systems that individually or jointly execute a set, or multiple sets, of instructions to perform one or more computer functions.

The information handling system 300 can include a disk drive unit and may include a computer-readable medium, not shown in FIG. 3, in which one or more sets of instructions, such as software, can be embedded. Further, the instructions may embody one or more of the methods or logic as described herein. In a particular embodiment, the instructions may reside completely, or at least partially, within system memory 304 or another memory included at system 300, and/or within the processor 302 during execution by the information handling system 300. The system memory 304 and the processor 302 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving, by a selection processing device, from a user, a request to add a list of items to a cart;
pre-authorizing a maximum amount of money for purchase of items in a list of items;
providing a secure link to a designated individual after the list of items is added to the cart, wherein the secure link enables the designated individual access to view and buy the items in the cart without exposing any confidential information of the user, wherein the confidential information includes credit card information of the user;
displaying, via a graphical user interface, the items in the cart as the list of available items in response to the secure link being selected by the designated individual;
displaying, via multiple boxes on the graphical user interface, multiple possible modifications for the items in the cart, wherein each modification for a particular item is placed in a different box on the graphical user interface;
receiving a selection of one or more items in the list of available items that the designated individual would like;
in response to a price of the selected one or more items being less than or equal to the pre-authorized maximum amount of money, purchasing the one or more items in the list of available items that the designated individual would like;
confirming an order of the selected one or more items;
in response to the price of the selected one or more items being less than the pre-authorized maximum amount of money, refunding unused funds to the user; and
sending a notification of completion of a transaction to the user.

2. The method of claim 1, further comprising:
displaying, via the graphical user interface, a plurality of items for purchase;
receiving, at the selection processing device, a selection of the first item displayed on the graphical user interface; and
adding, by the selection processing device, the first item to the list of items, wherein the list of items includes the first item, a second item, and a third item.

3. The method of claim 1, wherein the selection of the first item from the list of available items includes modifying the first item based on an option associated with purchasing the items in the cart.

4. The method of claim 1, further comprising receiving options for the designated individual, wherein the options are associated with purchasing the items in the cart.

5. The method of claim 4, wherein receiving the options includes receiving information associated with the designated individual, wherein the information includes an electronic mail identification of the designated individual.

6. The method of claim 4, wherein receiving the options includes pre-purchasing the items in the cart for a specific period of time.

7. An information handling system comprising:
a selection processing device of gift selection circuitry to receive, from a user, a request to add a list of items to a cart;
a delivery processing device of the gift selection circuitry to communicate with the selection processing device, the delivery processing device to provide a secure link to a designated individual after the list of items is added to the cart, wherein the secure link enables the designated individual access to view and buy the items in the cart without exposing any confidential information of the user, wherein the confidential information includes credit card information of the user, and to notify the user of one or more of the items in a list of available items that the designated individual would like after selection of the one or more of the items in the list of available items;
a graphical user interface to communicate with the selection processing device, the graphical user interface to display the items in the cart as the list of available items in response to the secure link being selected by the designated individual, and to display, via multiple boxes on the graphical user interface, multiple possible modifications for the items in the cart, wherein each modification for a particular item is placed in a different box on the graphical user interface; and
buying circuitry to communicate with the gift selection circuitry, the buying circuitry to: receive a pre-authorization of a maximum amount of money for purchase of items in the list of items; in response to a price of the selected one or more items being less than or equal to the pre-authorized maximum amount of money, the buying circuitry to purchase the selected one or more items in the list of available items that the designated individual would like; confirm an order of the selected one or more items; in response to the price of the selected one or more items being less than the pre-authorized maximum amount of money, the buying circuitry to refund unused funds to the user; and to send a notification of completion of a transaction to the user.

8. The information handling system of claim 7, the selection processing device further to receive a selection of the first item displayed on the graphical user interface prior to the request to add the list of items to the cart, and to add first item to the list of items, wherein the list of items includes the first item, a second item, and a third item.

9. The information handling system of claim 7, wherein the selection of the first item from the list of available includes the buying circuit to modify the first item based on an option associated with purchasing the items in the cart.

10. The information handling system of claim 7, the selection processing device further to receive options for a designated individual, wherein the options are associated with purchasing the items in the cart.

11. The information handling system of claim 7, the selection processing device further to receive information associated with the designated individual, wherein the information includes an electronic mail identification of the designated individual.

12. A method comprising:
  displaying, via a graphical user interface, a plurality of items for purchase;
  receiving, at a selection processing device, a selection of a first item displayed on the graphical user interface;
  adding, by the selection processing device, the first item to a list of items, wherein the list of items includes the first item, a second item, and a third item;
  receiving, from a user, a request to add the list of items to a cart;
  pre-authorizing a maximum amount of money for purchase of items in the list of items;
  receiving options for a designated individual, wherein the options are associated with purchasing the items in the cart;
  receiving information associated with the designated individual, wherein the information includes an electronic mail identification of the designated individual;
  providing first, second, and third secure links to the designated individual, wherein each of the first secure link, the second secure link, and the third secure link enables the designated individual access to view and buy respectively the first item, the second item, and the third item in the cart without exposing any confidential information of the user, wherein the confidential information includes credit card information of the user;
  displaying, via the graphical user interface, the first item in the cart in response to the first secure link being selected by the designated individual;
  displaying, via multiple boxes on the graphical user interface, multiple possible modifications for the items in the cart, wherein each modification for a particular item is placed in a different box on the graphical user interface;
  in response to a price of the first item being less than or equal to the pre-authorized maximum amount of money, purchasing the first item;
  confirming an order of the first item after the purchasing of the first item;
  in response to the price of the first item being less than the pre-authorized maximum amount of money, refunding unused funds to the user; and
  sending a notification of completion of a transaction to the user.

13. The method of claim 12, further comprising removing non-selected items from the cart.

14. The method of claim 12, the selection of the first item for purchase includes modifying the first item based on an option associated with purchasing the items in the cart.

15. The method of claim 12, further comprising receiving a search query prior to displaying the plurality of items for purchase.

16. The method of claim 12, wherein receiving the options includes receiving a number of items in the cart that the designated individual can buy.

17. The method of claim 12, wherein receiving the options includes pre-purchasing the items in the cart for a specific period of time.

* * * * *